Nov. 12, 1957 R. HUMMEL 2,812,843
CONTROL OR SAFETY MEANS FOR POWER PRESSES
Filed July 12, 1954

INVENTOR
RICHARD HUMMEL
BY Leon M. Strauss
AGT.

United States Patent Office 2,812,843
Patented Nov. 12, 1957

2,812,843

CONTROL OR SAFETY MEANS FOR POWER PRESSES

Richard Hummel, Goppingen, Wurttemberg, Germany, assignor to L. Schuler A. G., Goppingen, Wurttemberg, Germany Application July 12, 1954, Serial No. 442,775

Claims priority, application Germany July 18, 1953

14 Claims. (Cl. 192—150)

This invention relates to presses and more particularly to extrusion and like power presses with power cut-off safety means.

In known presses of this type it has been found suitable to provide a cut-off safety mechanism which automatically disconnects the power drive for the press through a coupling upon overload of the latter, so that parts of the cut-off safety mechanism previously connected to each other will not be damaged upon actuation of the safety mechanism.

In a press wherein the plunger or die is driven through the intermediary of several connecting rods associated with cut-off safety means, it is important that the press be stopped immediately upon actuation of one of the cut-off safety means or mechanisms. If in such a press due to unilateral overload the safety mechanism responds only in regard to one connecting rod, then the plunger may be easily subjected to canting during the ensuing slow-down motion thereof thereby damaging the press.

It is an object of the present invention to provide means overcoming these and other disadvantages of known cut-off mechanisms and affording transfer of elastic deformation of one or more press parts due to overload of the press into movement of an element associated with the cut-off safety mechanism.

It is a further object of the invention to provide means facilitating response of the cut-off mechanism independently of the braking path of the plunger, so that at the very moment in which the overload of the press occurs, the press coupling will disconnect the power drive from the press and braking of its moving parts will be initiated.

In many cases upon overload, the cutting-off mechanism is no longer actuated, as the drive will be disconnected forthwith. In cases in which the cutting-off mechanism is actuated, the moving parts are subjected to a braking effect due to a precipitated and effective brake mechanism and further through the deadening of energy caused through cut-off means within a relatively short, slowing down path without danger for the press.

It is a further object of the present invention to provide means ensuring positive movement of an element derived from the relative movement of a first press part which is elastically displaced under the prevailing pressure of the press relatively to a second press part which is free from any pressure or force but operatively connected to said first press part, whereby preferably such relative movement is translated and increased by a suitable lever transfer mechanism.

It is still a further object of the present invention to provide means conducive to the formation of an element which actuates safety means and consists of a two-armed angle lever which acts on a part of the press which is free from any pressure or force and is further in contact with a press part which is deformable under the pressure of the press, so that such lever will be displaced or swung due to a permissible deformation of the latter part about a pivot and is linked with coupling actuating means for disconnecting the power drive for the press.

According to another feature the present invention further contemplates the employment of said lever or an element biased against said lever as part of a locking mechanism for a member which is under spring action, but which upon release actuates control means for the press coupling, which member may be, for example, a catch member or like element.

In another embodiment of the invention such member is operatively associated, if desired, through further intermediary members, with contact arms, which are connectable to an electric circuit controlling the disconnection of the coupling of the press.

It is still another object of the present invention to provide means facilitating adjustment of the release of cut-off safety means upon reaching a predetermined maximum pressure of the press.

According to a further embodiment of the invention an arm of the aforesaid lever is operatively connected to a catch member in the locking position whereby said member is actuatable by a threaded part to thereby adjust the effective length of the catch member in regard to said lever arm.

In accordance with the invention switching means are disposed adjacent to and form part of said safety mechanism. However, said switching means may also be entirely separated from the safety mechanism, for instance, located on the standard of the press which takes up the pressure of the press. Finally, the switching means may also be employed as an independent power control device on presses devoid of any safety mechanism.

Further advantages, features and characteristics of the invention will ensue from the description of some embodiments of the invention and from the drawing attached hereto and in which.

Figure 1:
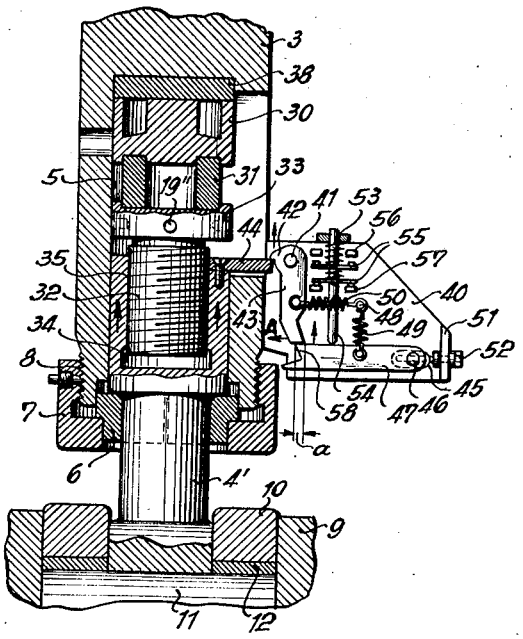
Fig. 1 is a fragmentary section of the connecting rod of a press equipped with safety means and with automatic power cut-off mechanism.

Referring more particularly to the drawing, there is shown in Fig. 1 an automatic cut-off mechanism for the press arranged directly adjacent parts 3 and 4' of which the connecting rod of the press consists. The lower part forming a bolt 4' is inserted in an upper, sleeve-shaped portion 5 of connecting rod part 3. A ring or flange 6 together with a cap screw 7 are employed in order to securedly hold part 4' in a recess of upper part 3, the cap screw 7 engaging threads 8 provided on said upper part 3. The lower part 4' is connected to a swivel head movable in guide means 9 and consisting of member 10 connected to a bolt 11 surrounded by bearing bushing 12. With this head, the press plunger proper is associated.

In the hollow space 5 of the sleeve-shaped connecting rod part 3 there are arranged a disk-shaped member 38, a shear member 30 and a shear ring 31, forming together a safety device subject to breakage upon sudden or excessive press overload.

The bolt-shaped connecting rod part 4' has a bore 34 provided with screw threads 35, into which fits a screw bolt 32. The head of screw bolt 32 has radially extending apertures 19" for facilitating adjusting the position of shear ring 31 against the shear member 30. By means of a tool inserted in any of the apertures 19" screw bolt 32 may be rotated and the overload shear safety device 30, 31 may be readily tensioned relative to the disk-shaped member 38. By means of cap screw 7 and screw 32 the plunger of the press (not shown) may be adjusted as to its position of height.

On the sleeve of connecting rod part 3 a plate or extension member 40 is secured on which are mounted parts of an automatically acting cut-off safety mechanism which becomes operative, when a predetermined overload on the connecting rod means of the press is reached to thereby automatically disconnect the press coupling. On plate member 40 is mounted a bearing pin 41 on which is pivoted a two-armed angle lever 42, 43. The short lever arm 42 is normally in contact with the end of an abutment member 44 which is secured to the lower connecting rod part 4'. The plate member 40 carries a further bearing pin 46 on which a catch or notched locking member 47 is pivotally mounted, the end of which is tensioned by means of a spring 49 which in turn is anchored at 48 on plate 40, whereby locking member 47 has the tendency to swing toward and to be held in contact with the lower end of the longer lever arm 43 of the lever 42, 43.

Against lever arm 43 a spring 50 acts which spring is also anchored at 48 on plate 40, whereby lever arm 43 remains normally in contact with locking member 47 while lever arm 42 is pressed against abutment piece 44. Bearing pin 46 is displaceably guided within a guide slot 45 of plate 40. The end of an adjustment screw 52, which is held on an angle piece 51 of plate 40, engages a threaded bore of pin 46 provided in the latter, so that a rotation of adjustment screw 52 causes movement of bearing pin 46 in longitudinal direction of guide slot 45.

A push pin 54, which is biased by a spring 53 and may be moved against locking member 47, is equipped with two contact arms 55 for selective cooperation with pairs of electric contacts 56 and 57. These pairs of electric contacts 56 and 57 are arranged in a circuit of an electromagnetically operable coupling device (not shown).

In operation, parts 4', 33, 31 and 30 of the shear safety means will be elastically displaced a small amount in upward direction under the influence of the pressing force relative to connecting rod part 3, which is free of any pressure. In such case, lever 42, 43 will be moved through abutment 44 about pivot pin 41 so that the longer lever arm 43 will be swung in a direction toward the left as indicated by arrow A. If the exerted pressure of the press, and through it the elastic displacement of the connecting rod means, becomes excessive and reached a preset value then lever arm 43 is displaced beyond the end 58 of locking member 47, whereby said member 47 will be unlatched and moved about pivot pin 46 by action of spring 49.

Through this movement, pin 54 will also be forced in upward direction, so that the contact pairs 55 disengage pairs of contact pieces 57 and engage pairs of contact pieces 56 instead, whereby the electric circuit to the coupling magnet (not shown) will be opened and the coupling will be disconnected. The length of the path *a* which the end of lever arm 43 must describe until the locking or catch member 47 is released, is adjustable by means of screw 52, as hereinabove indicated.

Figure 2:
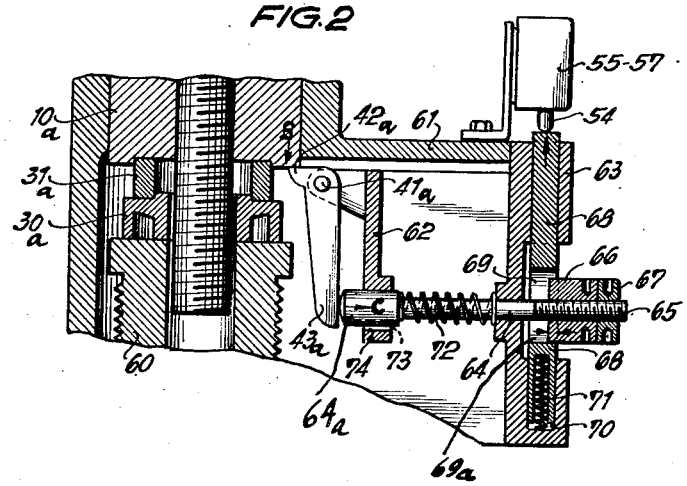
Fig. 2 shows the cut-off mechanism built in the plunger for the press.

In Fig. 2, a modified embodiment of the invention is shown, in which the shearing safety device 30a, 31a is built in and operatively connected to the plunger. Guide or abutment member 10a is connected with the swivel head on which the connecting rod is linked and part 60 is secured to the plunger proper. The supporting extension members 61, 62 and 63 for the automatic switching or cut-off mechanism are, in this particular instance, fixedly connected to the plunger proper. At pin 41a there is pivotally secured a two-armed lever 42a, 43a which abuts with its short arm 42a against the underface of guide or abutment piece 10a. The longer lever arm 43a abuts against an enlarged head 64a forming part of a locking bolt or pin 64 which latter is guided in supporting arms 62 and 63, and is displaceable relative thereto. A coil spring 72 is compressed between enlarged head 64a and arm 63. Pin 64 is prevented from rotation by the provision of a key-shaped projecting portion which is movable in guide or groove 74.

On the end of pin 64 remote from head 64 there is disposed a threaded end 65 on which is screwed a catch piece 66 retained by counter screw 67. A bolt 68 is mounted for vertical displacement within the hollow or sleeve-shaped supporting arm 63. Bolt 68 has a cut-out portion 69 through which pin 64 and catch piece 66 extend. At the lower portion of bolt 68 there is arranged a compression spring 71 which is guided within a bore 70, so that bolt 68 is urged upwardly, whereby the lower edge 69a of cut-out portion 69 is pressed against the lower edge of catch member or piece 66. On the upper end of bolt 68 there is disposed push pin 54 for actuation of the switching contact mechanism 55 to 57, as described in reference to Fig. 1.

In operation, due to the pressing force exerted by the connecting rod through guide or abutment piece 10a onto the plunger 60 an elastic displacement of parts is caused. Parts 61, 62 and 63, however, are free from direct pressure exertion. As a consequence, the short lever arm 42a of lever 42a, 43a is moved downwardly in the direction of arrow B and the longer lever arm 43a is swung in the direction of arrow C so that bolt 64 will also be moved towards the right commensurate with the displacement of lever 43a. Upon overload of the press, this elastic displacement of bolt 64 towards the right becomes sufficiently large so that the catch piece 66 is disengaged from cut-out portion 69, thereby releasing bolt 68. Consequently, bolt 68 is urged by compression spring 71 against the push-pin 54 for disconnection of the press coupling through switching contact mechanism 55—57, as described.

When the coupling is controlled hydraulically or pneumatically, the cut-off mechanism 55—57 may be included in the circuit of the electromagnet or solenoid adapted to move the control switch for the press. Alternatively, the locking lever or member 47 may be directly and mechanically connected with the press control switch or slide.

As an alternative to the arrangement shown in Fig. 2, arm 43a of the two-armed lever may be pivotally or universally coupled with pin 64 at enlarged head 64a, if desired.

It is further to be noted that the contacts 56 may be connected electrically with a braking mechanism so that in addition to merely cutting off the power supply to the press, a braking force is applied upon movement of contacts 56 away from pairs of contact pieces 57.

The shear members 30 and/or 31 are preferably composed of a yieldable material having sufficient strength for normal operation, such as a plastic or suitable metal alloy. In operation therefore such member will deform elastically, while, if too great a load is imposed on the press, the member 30 of the safety device is subject to breakage and will be sheared by ring 31 to stop and thus protect the press from damage of its vital parts. In such latter instance, the member 30 may readily be replaced by another member to complete the parts constituting the connecting rod.

It can thus be seen, that there has been provided according to the invention dual overload safety means for power-driven and coupling-operated machines having connecting rod means, namely, first shear safety means and second cut-off safety means, said first safety means being aligned with and operatively joined to said connecting rod means, second overload safety means arranged in the path of said connecting rod means and actuable by the latter for operating said coupling, and means connected to said second safety means and manipulatable to reset the latter from an operative to an inoperative position, said first safety means including deformable shear means adapted to break upon exertion of a maximum overload pressure on said connecting rod means, said second safety means being responsive to a predetermined overload pressure which is below said maximum overload pressure and corresponds to determinative deformation of said shear means, whereby upon reaching said predetermined pressure said second safety means will be actuated to assume said operative position in which said coupling is disconnected and said power drive is cut off.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A power control for a press and like machines comprising connecting rod means, plunger means, a two-armed lever, one arm of said lever being connected to one of said means, said connecting rod means being adapted to move said plunger means and being operatively connected thereto, first safety means constituting deformable means positioned intermediate said connecting rod means and said plunger means, and second safety means constituting a cut-off mechanism including switching means for controlling said power, said switching means being operatively connected to the other arm of said lever; said first safety means being movable relative to said second safety means, whereby upon displacement of said deformable means beyond a predetermined limit due to excessive power applied to said press, said one arm is moved together with said other arm for actuation of said switching means, to thereby control said power.

2. In a power-driven press having plunger means, connecting rod means for moving said plunger means, and a switch control for controlling said power drive; an elastically deformable unit positioned between said plunger means and said connecting rod means, and a cut-off mechanism including a two-armed lever pivotally supported adjacent said connecting rod means, one arm of said lever being operatively connected to one of said means, the other arm of said lever being engageable with said switch control, whereby a displacement of said plunger means relative to said connecting rod means may take place through elastic action of said deformable unit, thereby moving said one arm and pivoting said other arm with respect to said switch control for cutting off said power drive from said press upon reaching a predetermined pressure thereof, said deformable unit being actuatable independently of said cut-off mechanism and breakable upon occurrence of sudden overload pressure exceeding said predetermined pressure.

3. In a press according to claim 2, said switch control including pin means and a pair of engageable electrical contact means, one of said electrical contact means being carried by said pin means, a movable member disposed adjacent said pin means, and spring means urging said movable member to displace said pin means for disengagement of said electrical contact means, said movable member being operatively connected with said other lever arm to prevent said movable member from movement in normal operation of said press, whereby upon overloading said press pivoting of said other lever arm releases said movable member which then displaces said pin means under action of said spring means for disengagement of said electrical contacts.

4. In a power-driven press having plunger means; connecting rod means including a sleeve portion and a rod portion displaceably mounted therewithin, said sleeve portion being provided with an opening, said rod portion having two ends, one end of said rod portion being operatively connected with said plunger, the other end of said rod portion extending into said sleeve portion adjacent said opening, yieldable means disposed in said sleeve portion and maintaining said rod portion in substantially fixed position longitudinally within said sleeve portion, two-armed lever means pivotally arranged adjacent said sleeve portion, one arm of said lever means being operatively connected to said other end of said rod portion, switch control means operatively connected with the other arm of said lever means, said switch control means including pin means and a pair of engageable electrical contact means, one of said electrical contact means being carried by said pin means, a movable member disposed adjacent said pin means, and spring means urging said movable member to displace said pin means for disengagement of said electrical contact means, said movable member being operatively connected with said other lever arm to prevent said movable member from movement in normal operation of said press, whereby upon overloading of said press said rod portion is displaced within said sleeve portion relative to said yieldable means and said lever means is thereby pivoted to release said movable member for displacement of said pin means under the action of said spring means, thus causing disengagement of said electrical contacts for cutting-off said power drive, said connecting rod means including a bolt portion adjustably connected with said rod portion and in operative engagement with said yieldable means, whereby said yieldable means may be adjusted.

5. In a press according to claim 4, extension means carried by said sleeve portion, said extension means adjustably and pivotally carrying said movable member, said movable member being provided with a notch engaged by said other end of said lever means upon overloading of said press, whereby the predetermined limit at which said power drive is cut-off may be varied by adjustment of said movable member on said extension means.

6. In a press according to claim 4, said rod portion being provided with flange means, said flange means being longitudinally movable within a recess provided in said sleeve portion, said sleeve portion including an adjustable cap cooperating with said flange means, whereby the longitudinal dispositoin of said rod portion within said sleeve portion may be varied.

7. In a press according to claim 4, extension means carried by said sleeve portion, said extension means carrying said movable member, said movable member being provided with an opening, said switch control means further including a shaft extending from said other lever arm and terminating in latch means normally extending into said opening of said movable member and restraining the latter from displacing said pin means, whereby upon overloading of said press said shaft is moved by said other lever arm so that said latch means pass beyond said opening of said pin means to release the latter for cutting off the power supply.

8. The combination, in a power-driven press and like machine having a coupling and reciprocably movable rod means, of shear safety means, with cut-off safety means, said shear safety means extending in the direction of said rod means and being interposed between adjacent parts of the latter, said cut-off means being operatively connected to said rod means and being operable independently of said shear safety means, said cut-off means being adapted to automatically disconnect the coupling and through the latter the drive of said press upon occurrence of predetermined overload imparted to said rod means of said press, said shear safety means including yieldable means adjusted to said predetermined overload for response by said cut-off means, said shear safety means becoming operative in response to a sudden overload exceeding said predetermined overload and being subject to breakage to thereby stop said press.

9. In combination, a coupling-operated and power-driven press and like machine having connecting rod means, first overload safety means aligned with and operatively joined to said connecting rod means, second overload safety means arranged in the path of said connecting rod means and actuable by the latter for operating said coupling, and means connected to said second safety means and manipulatable to reset the latter from an operative to an inoperative position, said first safety means including deformable shear means adapted to break upon exertion of a maximum overload pressure on said connecting rod means, said second safety means being responsive to a predetermined overload pressure which is below said maximum overload pressure and corresponds to determinative deformation of said shear means, whereby upon reaching said predetermined pressure said second safety means will be actuated to assume said operative position in which said coupling is disconnected and said power drive is cut off.

10. The combination according to claim 9, said second overload safety means including an extension member, a two-armed lever arranged for pivotal movement on said extension member and having one arm in the path of abutment means provided on said connecting rod means, and electric contact means on said extension member and operatively connected to said coupling and to said two-armed lever, respectively, whereby during normal movement of said connecting rod means said two-armed lever remains in said inoperative position until said predetermined overload pressure sufficiently deforms said shear means, whereby said abutment means actuates said two-armed lever to assume said operative position.

11. The combination according to claim 10, including locking means supported on said extension member, said other arm of said lever being operatively connected to said locking means, said locking means being adjustably disposed and biased against a spring, whereby upon actuation of said lever said other arm of the latter causes displacement of said locking means, so that said second safety means is freed to assume its operative position.

12. The combination according to claim 9, wherein said first overload safety means is constructed and arranged for operation independently of said second overload safety means and responds to overload pressure beyond said predetermined pressure of said second safety means.

13. In a press having a coupling for connecting and disconnecting a power drive and having further reciprocally movable connecting rod means; first overload safety means aligned with and operatively joined to said connecting rod means, resettable second overload safety means including lever means arranged in the path of movement of said connecting rod means and actuable by the latter for disconnecting said coupling, said second safety means including manipulatable means to reset said second safety means to a position establishing connection of said coupling, said first safety means including deformable shear means adapted to break upon exertion of a maximum overload pressure on said connecting rod means, said second safety means being responsive to a predetermined overload pressure which is below said maximum overload pressure and corresponds to predetermined deformation of said shear means, whereby upon reaching said predetermined overload pressure said second safety means will be actuated to disconnect said coupling from said power drive, said second safety means further including spring-biased switch means operatively connected to said coupling and to said lever means, respectively, and shiftable locking means interposed between said lever means and said switch means and establishing through the latter said operative connection between said lever means and said coupling, whereby upon displacement of said locking means through action of said lever means said switch means is moved to a position for disconnecting said coupling, said manipulatable means forming part of said switch means.

14. In a press according to claim 13, including means connected to said locking means for adjusting the position of the latter relative to said lever means, to thereby regulate the sensitivity of said second safety means.

References Cited in the file of this patent
UNITED STATES PATENTS

| | | |
|---|---|---|
| 1,825,449 | Haller | Sept. 29, 1931 |
| 1,916,655 | Byerlein | July 4, 1933 |
| 2,013,248 | Nelson | Sept. 3, 1935 |
| 2,340,465 | Gerlach | Feb. 1, 1944 |
| 2,485,009 | Muller | Oct. 18, 1949 |
| 2,522,450 | Johansen | Sept. 12, 1950 |